(12) United States Patent
Prabhakaran et al.

(10) Patent No.: US 8,683,213 B2
(45) Date of Patent: Mar. 25, 2014

(54) PROGRESSIVE BOOT FOR A WIRELESS DEVICE

(75) Inventors: Rajeev Prabhakaran, San Diego, CA (US); Arshad Bebal, San Diego, CA (US); Ajit B Patil, San Diego, CA (US); Laura Yuan, San Diego, CA (US); Tarun Karra, San Diego, CA (US); Tom Kuo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1082 days.

(21) Appl. No.: 11/925,567

(22) Filed: Oct. 26, 2007

(65) Prior Publication Data

US 2009/0113558 A1    Apr. 30, 2009

(51) Int. Cl.
*G06F 21/00* (2013.01)

(52) U.S. Cl.
USPC .......................................... 713/187

(58) Field of Classification Search
USPC ........................................... 713/187; 726/26
See application file for complete search history.

(56) References Cited

U.S. PATENT DOCUMENTS

| | | | |
|---|---|---|---|
| 5,610,981 | A | 3/1997 | Mooney et al. |
| 6,106,396 | A | 8/2000 | Alcorn et al. |
| 6,185,678 | B1 | 2/2001 | Arbaugh et al. |
| 6,565,443 | B1 | 5/2003 | Johnson et al. |
| 6,625,729 | B1 | 9/2003 | Angelo et al. |
| 6,708,274 | B2 | 3/2004 | Herbert et al. |
| 7,694,121 | B2 | 4/2010 | Willman et al. |
| 2001/0007131 | A1 | 7/2001 | Galasso et al. |
| 2003/0018892 | A1 | 1/2003 | Tello |
| 2003/0028761 | A1* | 2/2003 | Platt ............................ 713/150 |
| 2003/0074550 | A1* | 4/2003 | Wilks et al. ..................... 713/2 |
| 2003/0079138 | A1 | 4/2003 | Nguyen et al. |
| 2003/0084298 | A1* | 5/2003 | Messerges et al. .......... 713/176 |
| 2003/0221049 | A1 | 11/2003 | Oguri et al. |
| 2005/0091496 | A1 | 4/2005 | Hyser |
| 2005/0193217 | A1* | 9/2005 | Case et al. .................... 713/200 |

(Continued)

FOREIGN PATENT DOCUMENTS

| | | |
|---|---|---|
| CN | 1926518 A | 3/2007 |
| DE | 10208442 | 5/2003 |

(Continued)

OTHER PUBLICATIONS

International Search Report and Written Opinion—PCT/US2008/080653, International Searching Authority—European Patent Office, Nov. 8, 2009.

(Continued)

*Primary Examiner* — Jason Gee
(74) *Attorney, Agent, or Firm* — Wok Tae Kim

(57) ABSTRACT

Techniques for performing progressive boot to reduce perceived boot time for a wireless device are described. Program codes to be stored in a bulk non-volatile memory may be partitioned into multiple code images. A first code image may include program codes used to support basic functionality of the wireless device. A second code image may include the remaining program codes. For progressive boot, the first code image may be loaded first from the bulk non-volatile memory. Once the first code image has been loaded, the wireless device may be rendered operational and may appear as functional to a user. While the wireless device is operational, the second code image may be loaded from the bulk non-volatile memory as background task and/or on-demand as needed.

38 Claims, 8 Drawing Sheets

(56) References Cited

U.S. PATENT DOCUMENTS

| | | | |
|---|---|---|---|
| 2005/0246518 A1* | 11/2005 | Takahashi | 713/2 |
| 2005/0251677 A1 | 11/2005 | Maeda et al. | |
| 2006/0224789 A1 | 10/2006 | Cho et al. | |
| 2007/0143530 A1 | 6/2007 | Rudelic et al. | |
| 2007/0192610 A1* | 8/2007 | Chun et al. | 713/176 |
| 2009/0064125 A1* | 3/2009 | Venkatachalam et al. | 717/170 |

FOREIGN PATENT DOCUMENTS

| | | | |
|---|---|---|---|
| JP | 7093980 | A | 4/1995 |
| JP | 2002139996 | A | 5/2002 |
| JP | 2002515765 | A | 5/2002 |
| JP | 2003519870 | A | 6/2003 |
| JP | 2003271391 | A | 9/2003 |
| JP | 2003337748 | A | 11/2003 |
| JP | 2004005585 | A | 1/2004 |
| JP | 2004118826 | A | 4/2004 |
| JP | 2004179724 | A | 6/2004 |
| JP | 2004192019 | A | 7/2004 |
| JP | 2004265286 | A | 9/2004 |
| JP | 2005157528 | A | 6/2005 |
| JP | 2005215824 | A | 8/2005 |
| JP | 2006146485 | A | 6/2006 |
| JP | 2006178909 | A | 7/2006 |
| JP | 2006243780 | A | 9/2006 |
| JP | 2006286179 | A | 10/2006 |
| JP | 2008526119 | A | 7/2008 |
| JP | 2009532990 | | 9/2009 |
| RU | 2005115918 | A | 11/2006 |
| TW | 266241 | B | 11/2006 |
| WO | WO9701902 | A1 | 1/1997 |
| WO | WO0021238 | | 4/2000 |
| WO | WO0150230 | | 7/2001 |
| WO | WO2006082985 | A2 | 8/2006 |
| WO | WO2007095465 | | 8/2007 |

OTHER PUBLICATIONS

Kevin R.B., "Rootkit-resistant disks", Oct. 2008, CCS '08, Proceedings of the 15th ACM conference on Computer and communications security, Publisher, ACM, pp. 403-415.

"ASPV23—System Manual J2K0-3468-01A", the first edition, Dec. 2006, Fujitsu Limited, pp. 173-181.

Mark Minasi (and 3 others), translated and edited by Top Studio Co., Ltd, "Windows 2000 Server Perfect Guide, vol. 2, Construction and Operation", the first edition, Aug. 31, 2000, Shoeisha Co., Ltd., pp. 366-368.

Taiwan Search Report—TW097141081—TIPO—Sep. 26, 2012.

* cited by examiner

PROGRESSIVE BOOT FOR A WIRELESS DEVICE

BACKGROUND

I. Field

The present disclosure relates generally to electronics, and more specifically to techniques for booting a wireless device at power up.

II. Background

A wireless device (e.g., a cellular phone) typically operates based on program codes that control the hardware within the wireless device and support various designed functions. The program codes may be stored in a bulk non-volatile memory and may be loaded into a faster volatile memory at power up. The bulk non-volatile memory may be a NAND Flash that can economically store a large amount of data but can only be accessed one page at a time. A page may be the smallest unit of data that can be retrieved from the NAND Flash and may be four kilobytes (KB) or some other size. The faster volatile memory may be a synchronous dynamic random access memory (SDRAM) that can support random access. The memories may be selected to provide the desired storage capacity and access capability and to be as economical as possible.

When the wireless device is powered up, all of the program codes may be loaded from the bulk non-volatile memory into the faster volatile memory. Once all of the program codes have been loaded, the wireless device may be enabled to accept user inputs and perform user selected functions. The amount of program codes to load at power up may be large, and the boot time may be relatively long. Hence, the user may need to wait an extended period of time before the wireless device is operational.

SUMMARY

In one aspect, an apparatus includes a processor configured to program first and second code images into a memory device used for a wireless device, the first code image being loaded from the memory device to boot the wireless device and render the wireless device operational, the second code image being loaded from the memory device while the wireless device is operational to further boot the wireless device.

In another aspect, a method includes programming a first code image into a memory device used for a wireless device, the first code image being loaded from the memory device to boot the wireless device and render the wireless device operational. The method further includes programming a second code image into the memory device, the second code image being loaded from the memory device while the wireless device is operational to further boot the wireless device.

In another aspect, an apparatus includes means for programming a first code image into a memory device used for a wireless device, the first code image being loaded from the memory device to boot the wireless device and render the wireless device operational and means for programming a second code image into the memory device, the second code image being loaded from the memory device while the wireless device is operational to further boot the wireless device.

In another aspect, an apparatus includes a memory controller configured to load a first code image from an external memory to boot a wireless device and a main controller configured to render the wireless device operational after loading the first code image, and wherein the memory controller is further configured to load a second code image from the external memory while the wireless device is operational to further boot the wireless device.

In another aspect, a method includes loading a first code image from an external memory to boot a wireless device, rendering the wireless device operational after loading the first code image, and loading a second code image from the external memory while the wireless device is operational to further boot the wireless device.

In another aspect, an apparatus includes means for loading a first code image from an external memory to boot a wireless device, means for rendering the wireless device operational after loading the first code image, and means for loading a second code image from the external memory while the wireless device is operational to further boot the wireless device.

In another aspect, a computer program product includes a computer-readable medium comprising code for causing a computer to load a first code image from an external memory to boot a wireless device, code for causing a computer to render the wireless device operational after loading the first code image, and code for causing a computer to load a second code image from the external memory while the wireless device is operational to further boot the wireless device.

In another aspect, an apparatus includes a memory controller configured to retrieve a plurality of pages of a code image from an external memory, the plurality of pages being associated with separate security information, and to authenticate each page retrieved from the external memory based on security information for the page.

In another aspect, a method includes retrieving a plurality of pages of a code image from an external memory, the plurality of pages being associated with separate security information, and authenticating each page retrieved from the external memory based on security information for the page.

In another aspect, an apparatus includes means for retrieving a plurality of pages of a code image from an external memory, the plurality of pages being associated with separate security information and means for authenticating each page retrieved from the external memory based on security information for the page.

DETAILED DESCRIPTION

The boot techniques described herein may be used for various electronics devices such as wireless communication devices, handheld devices, game devices, computing devices, consumer electronics devices, computers, etc. For clarity, the techniques are described below for a wireless communication device having a memory such as a NAND Flash memory and an SDRAM.

Figure 1:
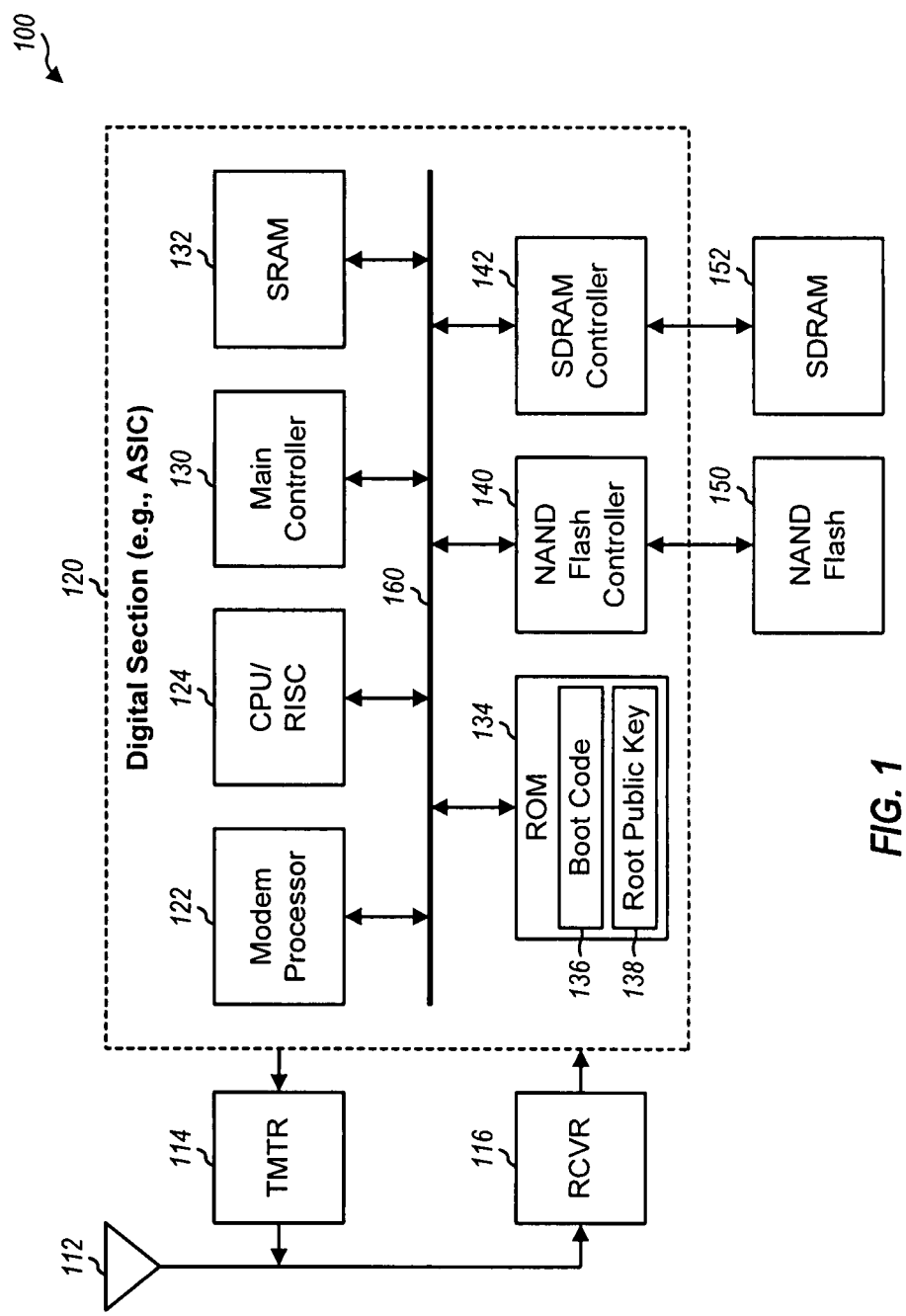
FIG. 1 shows a block diagram of a wireless communication device.

FIG. 1 shows a block diagram of a wireless communication device 100 in accordance with an aspect of the invention, which may be a cellular phone, a personal digital assistant (PDA), a handset, a handheld device, a wireless module, a terminal, a modem, etc. Wireless device 100 may be capable of providing bi-directional communication with one or more wireless communication systems via a transmit path and a receive path. On the transmit path, a digital section 120 may provide data to be transmitted by wireless device 100. A transmitter (TMTR) 114 may process the data to generate a radio frequency (RF) output signal, which may be transmitted via an antenna 112 to base stations. On the receive path, signals transmitted by the base stations may be received by antenna 112 and provided to a receiver (RCVR) 116. Receiver 116 may condition and digitize the received signal and provide samples to digital section 120 for further processing.

Digital section 120 may include various processing, interface, and memory units that support digital processing for wireless device 100. In the design shown in FIG. 1, digital section 120 includes a modem processor 122, a central processing unit (CPU)/reduced instruction set computer (RISC) 124, a main controller 130, a static RAM (SRAM) 132, a read-only memory (ROM) 134, a NAND Flash controller 140, and an SDRAM controller 142, all of which may communicate with one another via one or more buses 160. Modem processor 122 may perform processing for data transmission and reception, e.g., encoding, modulation, demodulation, decoding, etc. CPU/RISC 124 may perform general-purpose processing for wireless device 100, e.g., processing for audio, video, graphics, and/or other applications. Main controller 130 may direct the operation of various units within digital section 120. SRAM 132 may store program codes and data used by the controllers and processors within digital section 120. ROM 134 may store a boot code 136 and a root public key 138. Boot code 136 may perform an initial part of power-up boot and may start loading program codes from a NAND Flash 150 when wireless device 100 is powered up. Root public key 138 may be used for security functions, e.g., to authenticate the program codes loaded from NAND Flash 150.

NAND Flash controller 140 may facilitate transfer of data between NAND Flash 150 and digital section 120. SDRAM controller 142 may facilitate transfer of data between an SDRAM 152 and digital section 120. Main controller 130 may direct the operation of NAND Flash controller 140 and/or SDRAM controller 142. For example, main controller 130 may direct loading of program codes from NAND Flash 150 to SDRAM 152 during boot up, e.g., when wireless device 100 is powered on.

NAND Flash 150 and SDRAM 152 may provide mass storage for the processing units within digital section 120. NAND Flash 150 may provide non-volatile storage for program codes and data used by digital section 120. NAND Flash 150 may also be replaced with other types of non-volatile memory, e.g., a NOR Flash. SDRAM 152 may provide storage with random access capability for program codes and data used by digital section 120. SDRAM 152 may also be replaced with other types of volatile memory, e.g., an SRAM, a DRAM, etc.

In general, digital section 120 may include any number of processing, interface, and memory units. Digital section 120 may also be implemented with one or more digital signal processors (DSPs), micro-processors, RISC processors, etc. Digital section 120 may be fabricated on one or more application specific integrated circuits (ASICs) and/or some other type of integrated circuits (ICs).

As shown in FIG. 1, wireless device 100 may utilize a memory architecture with different types of memory. SDRAM 152 is a volatile memory that lose its data once power is removed. SDRAM 152 may be accessed in a random manner and is commonly used as the main run-time memory. NAND Flash 150 is a non-volatile memory that can retain its data even after power is removed. NAND Flash 150 has large storage capacity, good speed for continued memory access, and low cost. However, NAND Flash 150 has poor performance for random memory access and is typically accessed in units of pages, one page at a time, with each page being of a particular size (e.g., 4 KB).

The memory architecture in FIG. 1 incorporates both NAND Flash 150 and SDRAM 152 and is capable of providing large storage capacity with random access at reduced cost. For this memory architecture, program codes may be permanently stored in NAND Flash 150. The program codes may control the hardware within wireless device 100 as well as support various designed functions and features. Upon power up, wireless device 100 may perform a boot that may entail transferring the program codes from NAND Flash 150 to SDRAM 152. NAND Flash 150 may store a large amount of program codes. Hence, the amount of time to load all of the program codes from NAND Flash 150 to SDRAM 152 at power up may be relatively long.

In an aspect, the program codes to be stored in NAND Flash 150 may be partitioned into multiple code images that may be stored in different segments of NAND Flash 150. A segment may also be referred to as a partition, a section, etc. In one design, the program codes may be partitioned into first and second code images. The first code image may include program codes used to support basic functionality of wireless device 100 and may be stored in a non-paged segment of NAND Flash 150. The second code image may include the remaining program codes and may be stored in a paged segment of NAND Flash 150. For progressive boot at power up, the first code image may be loaded first from the non-paged segment of NAND Flash 150 into SDRAM 152. Once the first code image has been loaded, wireless device 100 may be enabled and may appear as functional to a user. While wireless device 100 is operational, the second code image may be loaded from the paged segment of NAND Flash 150 into SDRAM 152, e.g., as background task and/or on-demand as needed. The progressive boot may shorten the amount of time to enable wireless device 100 at power up, which may improve user experience and provide other benefits.

The program codes stored in NAND Flash 150 may include codes that control the operation of wireless device 100, higher layer applications that support various designed features and functions, factory test codes, and/or other types of codes. It may be desirable or necessary to ascertain whether or not the program codes stored in NAND Flash 150 are authorized for use, to allow execution of program codes that are authorized, and to prevent execution of program codes that are unauthorized. Furthermore, it may be desirable to provide security in an efficient manner for the multiple code images used for progressive boot.

In another aspect, security may be efficiently provided for progressive boot by performing authentication for the entire first code image and also for each page of the second code image. The first code image may be loaded first from NAND Flash 150 in its entirely at power up and may be authenticated when loaded. The second code image may be partitioned into pages and loaded one page at a time from NAND Flash 150. The pages of the second code image may be loaded in different orders depending on memory accesses. Each page of the second code image may be authenticated individually to allow the page to be loaded and used without regards to the other pages of the second code image.

Figure 2:
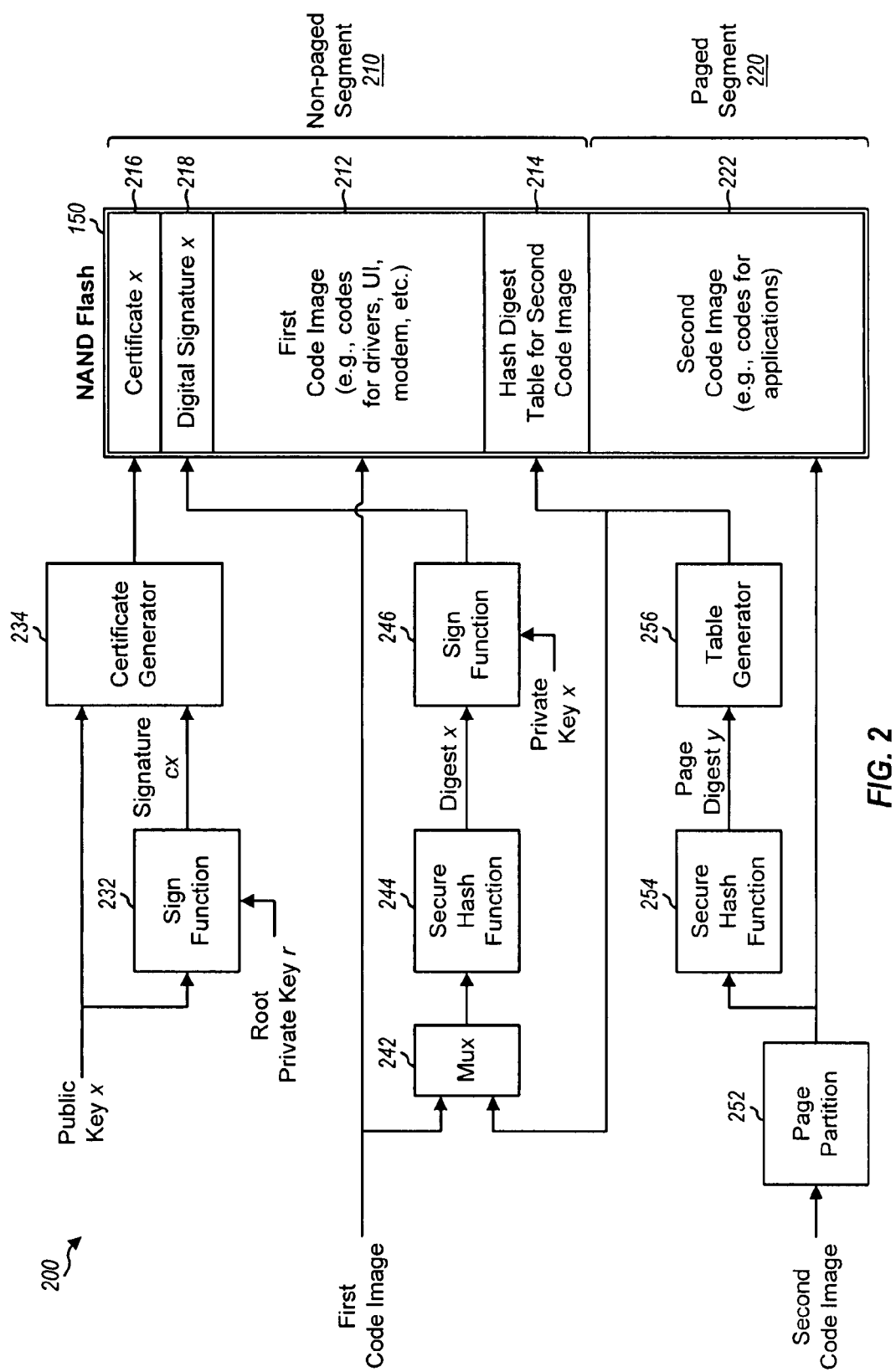
FIG. 2 shows programming of non-paged and paged segments of a NAND Flash.

FIG. 2 shows a design of NAND Flash 150, which includes a non-paged segment 210 and a paged segment 220, in accordance with an aspect of the invention. In this design, non-paged segment 210 stores a first code image 212, a hash digest table 214, a certificate 216, and a digital signature 218. Certificate 216 may include cryptographic information used to authenticate non-paged segment 210 and paged segment 220. Digital signature 218 may be generated over both first code image 212 and hash table 214 and may be used to authenticate these two parts. First code image 212 may include program codes and/or data to be loaded from NAND Flash 150 prior to enabling wireless device 100, e.g., codes for drivers, user interface (UI), modem, etc. Table 214 may include cryptographic hash digests for individual pages of a second code image 222. Second code image 222 may include program codes and/or data to be loaded from NAND Flash 150 after enabling wireless device 100, e.g., codes for higher layer applications. In general, a code image may include program codes, data, etc.

FIG. 2 also shows a design of a process 200 to program non-paged segment 210 and paged segment 220 of NAND Flash 150. Process 200 may be performed during manufacturing of NAND Flash 150, provisioning of wireless device 100, etc. The design in FIG. 2 uses two sets of cryptographic keys: (1) a set of private and public keys to sign and authenticate non-paged segment 210, which are referred to as private key x and public key x, and (2) a set of private and public keys to authenticate a source entity, which are referred to as root private key r and root public key r. Root private key r and private key x are secret and only known to the source entity, which may be a source code vendor, a manufacturer, etc. Root public key r is made available to wireless device 100 and is used to verify digital signatures generated with root private key r. Public key x is used to verify digital signatures generated with private key x and may be sent in certificate 216.

A sign function 232 may generate a digital signature over public key x and possibly other information using root private key r. This digital signature may be referred to as signature cx and may be used to authenticate the source entity. Sign function 232 may implement an RSA (Rivest, Shamir and Adleman) algorithm, a Digital Signature Algorithm (DSA), or some other cryptographic (digital signature or encryption) algorithm. A certificate generator 234 may form a certificate containing signature cx, public key x, and possibly other information such as an identifier of the source entity, the cryptographic algorithm selected for use, the expiration date of the certificate, etc. This certificate may be stored in NAND Flash 150 as an X.509 certificate or in some other format known in the art. Root public key r may be made available to wireless device 100 in any manner and may be securely stored in ROM 134 within wireless device 100 in FIG. 1.

In the design shown in FIG. 2, second code image 222 may be processed and stored first, and first code image 212 may be processed and stored next. A page partition unit 252 may receive and partition second code image 222 into pages of a particular size (e.g., 4 KB) and may provide one page at a time to a secure hash function 254 and also to NAND Flash 150. Function 254 may hash each page from unit 252 with a secure hash algorithm and provide a hash digest for that page. Function 254 may implement SHA-1 (Secure Hash Algorithm), SHA-2 (which includes SHA-224, SHA-256, SHA-384 and SHA-512), MD-4 (Message Digest), MD-5, or some other secure hash algorithm known in the art. A secure hash algorithm has cryptographic properties so that the function between an input message and its digest (which is a pseudo-random bit string) is irreversible and the likelihood of two input messages mapping to the same digest is very small. A secure hash algorithm may receive an input message of any length and may provide a hash digest of a fixed length. A table generator 256 may generate a table of hash digests for all pages of second code image 222 and may store this table as hash digest table 214 in NAND Flash 150.

First code image 212 may be provided to a multiplexer (Mux) 242 and also stored in NAND Flash 150. Multiplexer 242 may also receive hash digest table 214 from generator 256 and may sequentially provide first code image 212 and hash digest table 214 to a secure hash function 244. Function 244 may hash both first code image 212 and hash digest table 214 with a secure hash algorithm and may provide a hash digest, which may be called digest x. Function 244 may implement SHA-1, SHA-2, MD-5, or some other secure hash algorithm. A sign function 246 may generate a digital signature over digest x using private key x. This digital signature may be stored as digital signature 218 in NAND Flash 150. Sign function 246 may implement the RSA, DSA, or some other cryptographic algorithm. Sign functions 232 and 246 may implement the same or different cryptographic algorithms.

Figure 3:
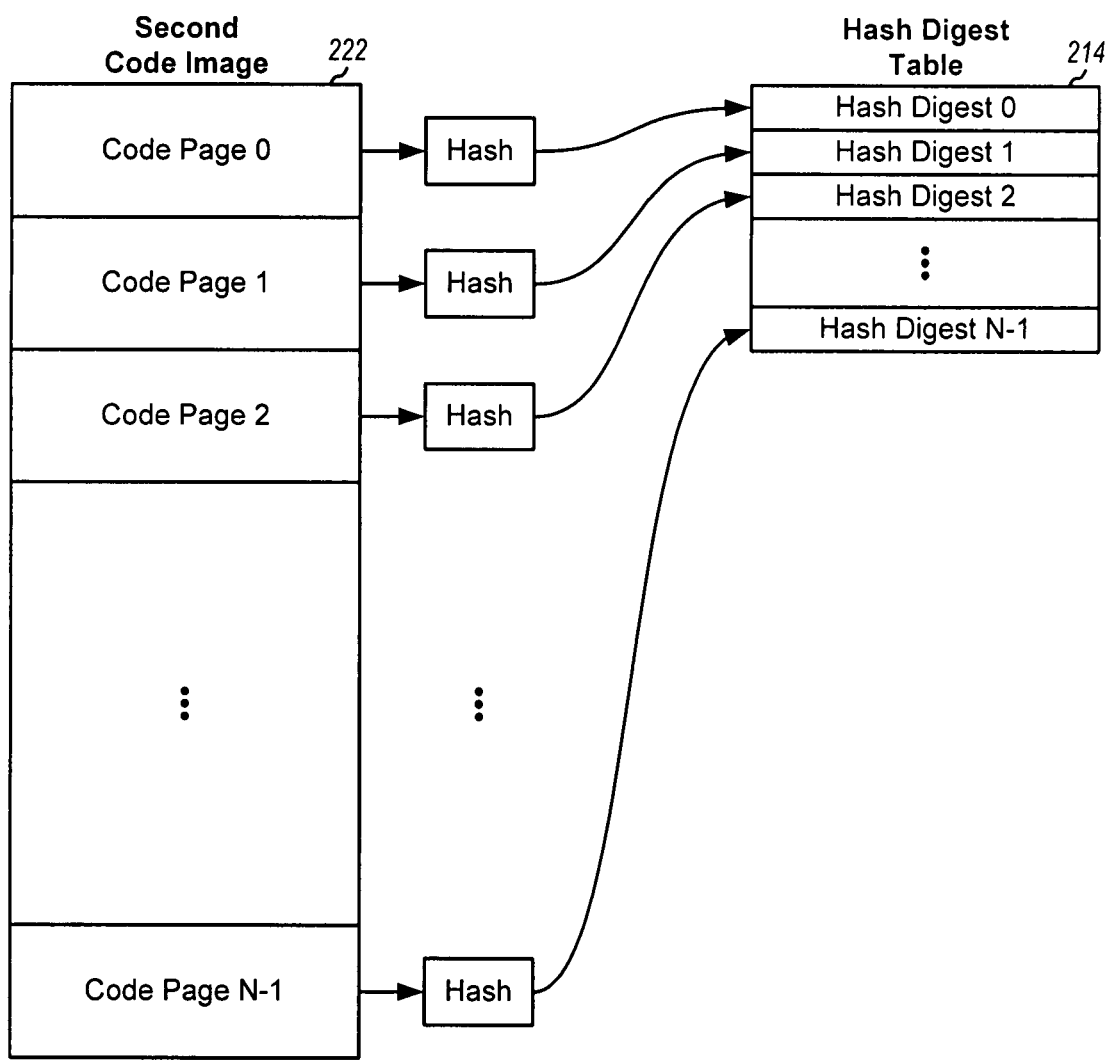
FIG. 3 shows a second code image and a hash digest table.

FIG. 3 shows a design of second code image 222 and hash digest table 214 in NAND Flash 150. In this design, second code image 222 may be partitioned into N pages 0 through N−1, where N may be any integer value. Each code page may be hashed with a secure hash algorithm (Hash) to generate a corresponding hash digest. Hash digest table 214 may store N hash digests for the N code pages.

Figure 4:
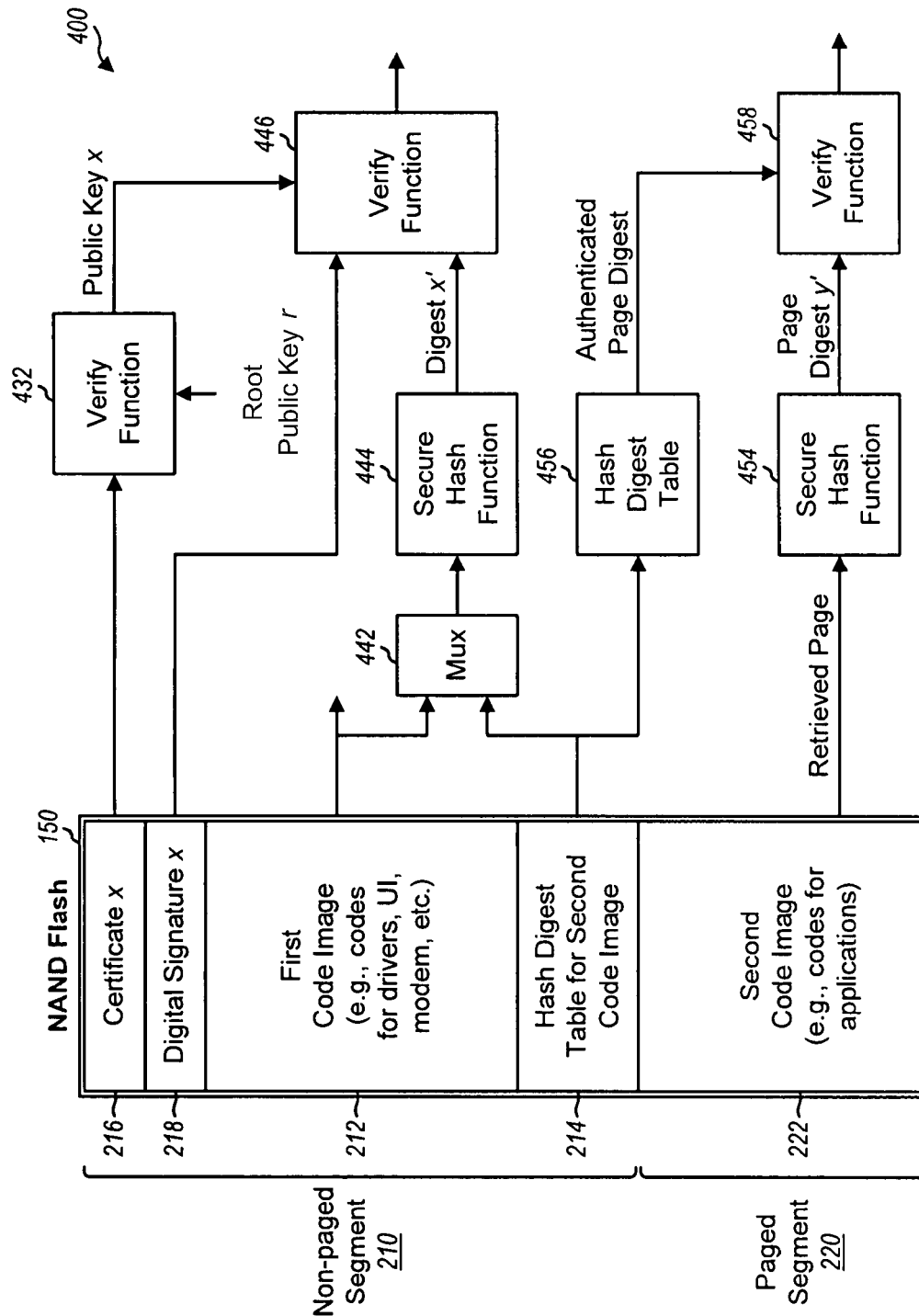
FIG. 4 shows loading and authentication of the first and second code images.

FIG. 4 shows a design of a process 400 to load and authenticate non-paged segment 210 and paged segment 220 of NAND Flash 150, in accordance with an aspect of the invention. Process 400 may be performed when wireless device 100 is power up, etc. A verify function 432 may receive certificate 216 from NAND Flash 150 and root public key r from ROM 134 within wireless device 100 in FIG. 1. Verify function 432 may extract signature cx and public key x from certificate 216, verify signature cx with root public key r, and provide public key x if signature cx is verified. Any tampering with certificate x by a third party can be easily detected by signature cx not verifying.

A multiplexer 442 may receive first code image 212 and hash digest table 214 and may sequential provide both parts to a secure hash function 444. Function 444 may hash both first code image 212 and hash digest table 214 and may provide a hash digest, which may be called digest x'. Function 444 may implement the same secure hash algorithm used by secure hash function 244 in FIG. 2. A verify function 446 may receive digest x' from secure hash function 444, digital signature x from NAND Flash 150, and public key x from verify function 432. Verify function 446 may verify digital signature 218 with public key x and digest x' and may indicate whether or not digital signature 218 is verified. Public key x is authenticated with root public key r. Hence, any tampering with digital signature 218, first code image 212, and/or hash digest table 214 by a third party can be easily detected by digital signature 218 not verifying.

If digital signature 218 is verified, then first code image 212 may be provided for use, and hash digest table 214 may be stored in a table 456. Wireless device 100 may be enabled once first code image 212 has been loaded from NAND Flash 150 to SDRAM 152. If digital signature 218 is not verified, then the loading process may be aborted, and an error message may be provided.

After enabling wireless device 100, second code image 222 may be loaded from NAND Flash 150 to SDRAM 152, one page at a time, as background task and/or on-demand as needed. A secure hash function 454 may hash a page retrieved from NAND Flash 150 and may provide a hash digest y' for the retrieved page. Function 454 may implement the same secure hash algorithm used by secure hash function 254 in FIG. 2. A verify function 458 may receive the hash digest y' from secure hash function 454 and the authenticated hash digest y for the retrieved page from table 456. Verify function 458 may compare the two hash digests y' and y and declare the retrieved page as authenticated if the two digests match. Hash digest table 214 may be authenticated with root public key r. The cryptographic properties of the secure hash algorithm ensure that the likelihood of another page mapping to the same hash digest y is very small. Hence, any tampering with the page by a third party can easily be detected by a mismatch between the two hash digests. The retrieved page may be provided for use if the hash digests match. The loading process may be aborted and an error message may be provided if the hash digests do not match.

FIGS. 2 to 4 show one design of NAND Flash 150, which supports progressive boot of non-paged segment 210 and paged segment 220 and further supports authentication of the code images stored in segments 210 and 220. In general, NAND Flash 150 may store P code images in P paged segments and Q code images in Q non-paged segments, where P and Q may each be any integer value one or greater. The code images from the Q non-paged segments may be loaded from NAND Flash 150 prior to enabling wireless device 100. The code images from the P paged segments may be loaded from NAND Flash 150 after enabling wireless device 100.

Security for the code images stored in the non-paged and paged segments may be implemented in various manners. In general, security information used for authentication may comprise one or more certificates, digital signatures, hash digests, etc. Security information used to authenticate a code image from a non-paged segment (or simply, a non-paged code image) may be stored in that non-paged segment, in a designated non-paged segment, etc. Security information used to authenticate a code image from a paged segment (or simply, a paged code image) may be stored in that page segment, in another paged segment, in a non-paged segment, etc. Security information may be provided for each page of a paged code image to allow each page to be loaded and authenticated separately. Security information may also be provided for an entire paged code image. In one design, one non-paged segment may store security information for all non-paged and paged segments, as described above. In another design, authentication may be performed in a daisy chain manner, with each segment storing security information for the next segment to be loaded. Authentication of the non-paged and paged code images may also be performed in other manners.

For clarity, the following description assumes the use of the structure shown in FIGS. 2 to 4, and that NAND Flash 150 includes non-paged segment 210 and paged segment 220. Non-paged segment 210 may include program codes that support basic functionality of wireless device 100, codes to support progressive boot, etc. Paged segment 220 may include the remaining program codes for wireless device 100.

Figure 5:
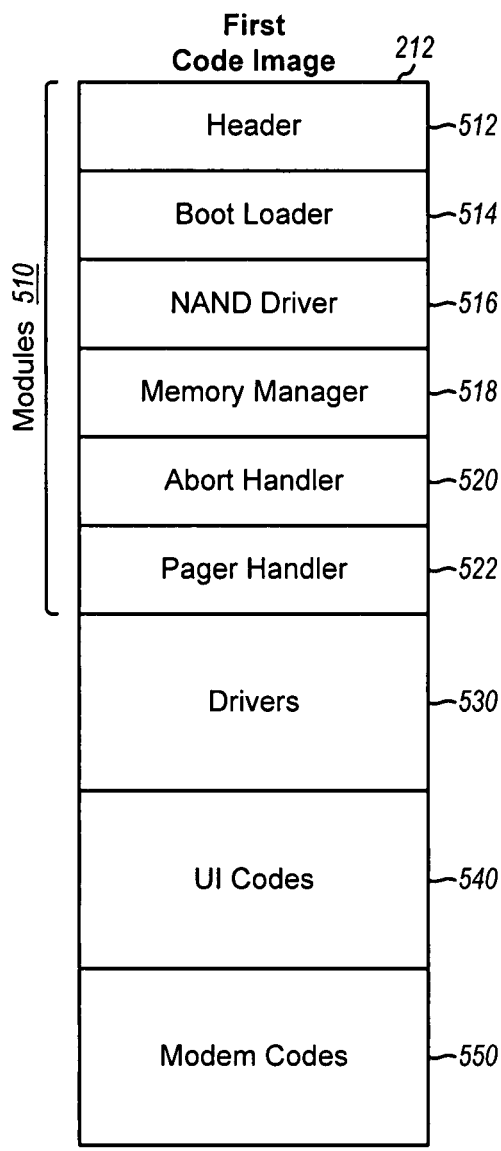
FIG. 5 shows modules in the first code image.

FIG. 5 shows a design of first code image 212 stored in non-paged segment 210 of NAND Flash 150. In this design, first code image 212 includes modules 510 that support progressive boot, drivers 530, user interface (UI) codes 540, and modem codes 550.

Within modules 510, a header 512 may include pertinent information for NAND Flash 150 such as the number of paged and non-paged segments, the starting address and size of each segment, the location of each segment header, etc. A boot loader 514 may handle the loading of non-paged segment 210 from NAND Flash 150 to SDRAM 152. A NAND driver 516 may retrieve pages from NAND Flash 150 and copy these pages to SDRAM 152. A memory manager 518 may handle the loading of paged segment 220 from NAND Flash 150 to SDRAM 152 and may keep tracks of which pages of second code image 222 have been loaded. An abort handler 520 may handle page faults due to memory accesses of pages of second code image 222 that have not been loaded from NAND Flash 150. When a page fault occurs, abort handler 520 may save the context of the current task and then request a pager handler 522 to load one or more pages including the requested page. Pager handler 522 may handle background and on-demand paging of requested pages of second code image 222 from NAND Flash 150. Boot loader 514 and pager handler 522 may request NAND driver 516 to retrieve specific pages from NAND Flash 150 and copy these pages to SDRAM 152.

Drivers 530 may support input/output (I/O) devices such as a liquid crystal display (LCD), a keypad, a microphone, a speaker, etc. UI codes 540 may support various UI functions such as display of animation at power up, acceptance of keypad inputs, display of pressed characters on the LCD, etc. UI codes 540 may provide an indication of life on wireless device 100 and may accept user inputs so that the wireless device can be perceived as operational to the user. Modem codes 550 may perform various functions to support radio communication, e.g., to initialize transmitter 114 and receiver 116, to search for wireless systems, to originate and receive calls, to perform processing (e.g., encoding and decoding) for the calls, etc.

FIG. 5 shows one design of non-paged segment 210. Non-paged segment 210 may also include different and/or other modules not shown in FIG. 5. For example, non-paged segment 210 may include factory test codes, Binary Runtime Environment for Wireless (BREW) Application Execution Environment (AEE) codes, etc.

Figure 6:
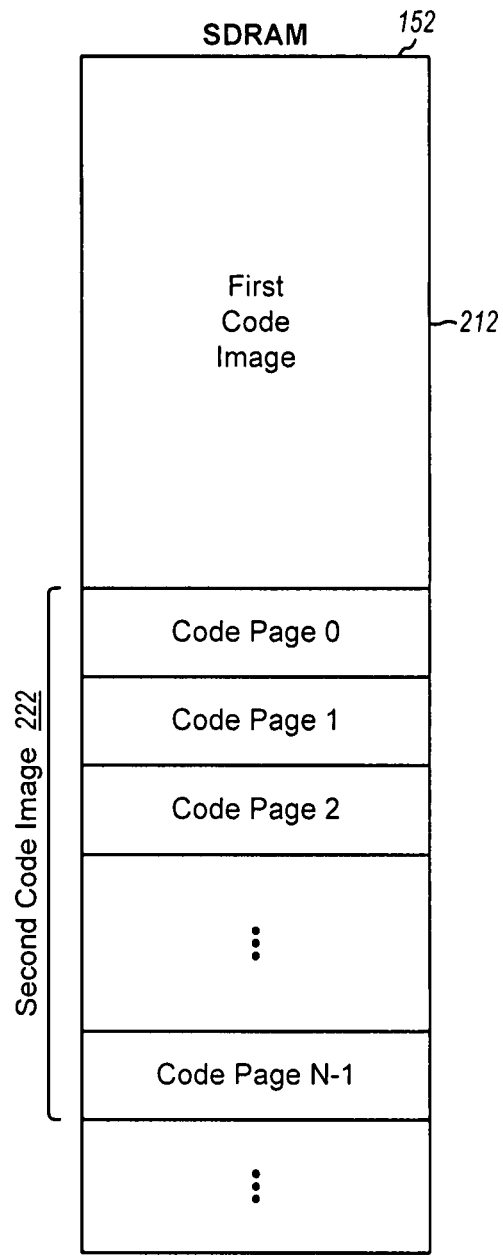
FIG. 6 shows an SDRAM at the wireless device.

FIG. 6 shows a design of SDRAM 152 at wireless device 100 in FIG. 1. First code image 212 may be retrieved from NAND Flash 150 and stored in SDRAM 152 during the first part of the progressive boot. Pages 0 through N−1 of second code image 222 may be retrieved in any order from NAND Flash 150 and stored in the proper location of SDRAM 152 during the second part of the progressive boot.

Background loading of second code image 222 may commence after first code image 212 has been loaded into SDRAM 152. For background loading, the N pages of second code image 222 may be retrieved one page at a time and in a sequential order from NAND Flash 150, authenticated, and stored in a corresponding location of SDRAM 152. The entire second code image 222 may be completely loaded into SDRAM 152 in a particular amount of time, which may be referred to as the secondary load time. The background loading may be given lower priority than other tasks performed by wireless device 100. Hence, the secondary load time may be variable and may be dependent on various factors such as the size of second code image 222, the transfer rate between NAND Flash 150 and SDRAM 152, the amount of activity at wireless device 100, etc.

While performing background loading, a page of second code image 222 that has not yet been loaded may be accessed, and a page fault may occur. The requested page may be loaded on-demand from NAND Flash 150 and provided for use. In one design, only the requested page is loaded from NAND Flash 150. In another design, the requested page and one or more nearby pages may be loaded from NAND Flash 150. This design may avoid repeated page faults and hence improve performance. After completing the on-demand paging of the requested page, background loading of the remaining pages of second code image 222 may be resumed.

Memory manager 518 may keep track of which pages of second code image 222 have been loaded from NAND Flash 150. This information may be used to determine whether a requested page is stored in SDRAM 152 or should be retrieved from NAND Flash 150. The load status of the pages of second code image 222 may be stored in various manners.

Figure 7:
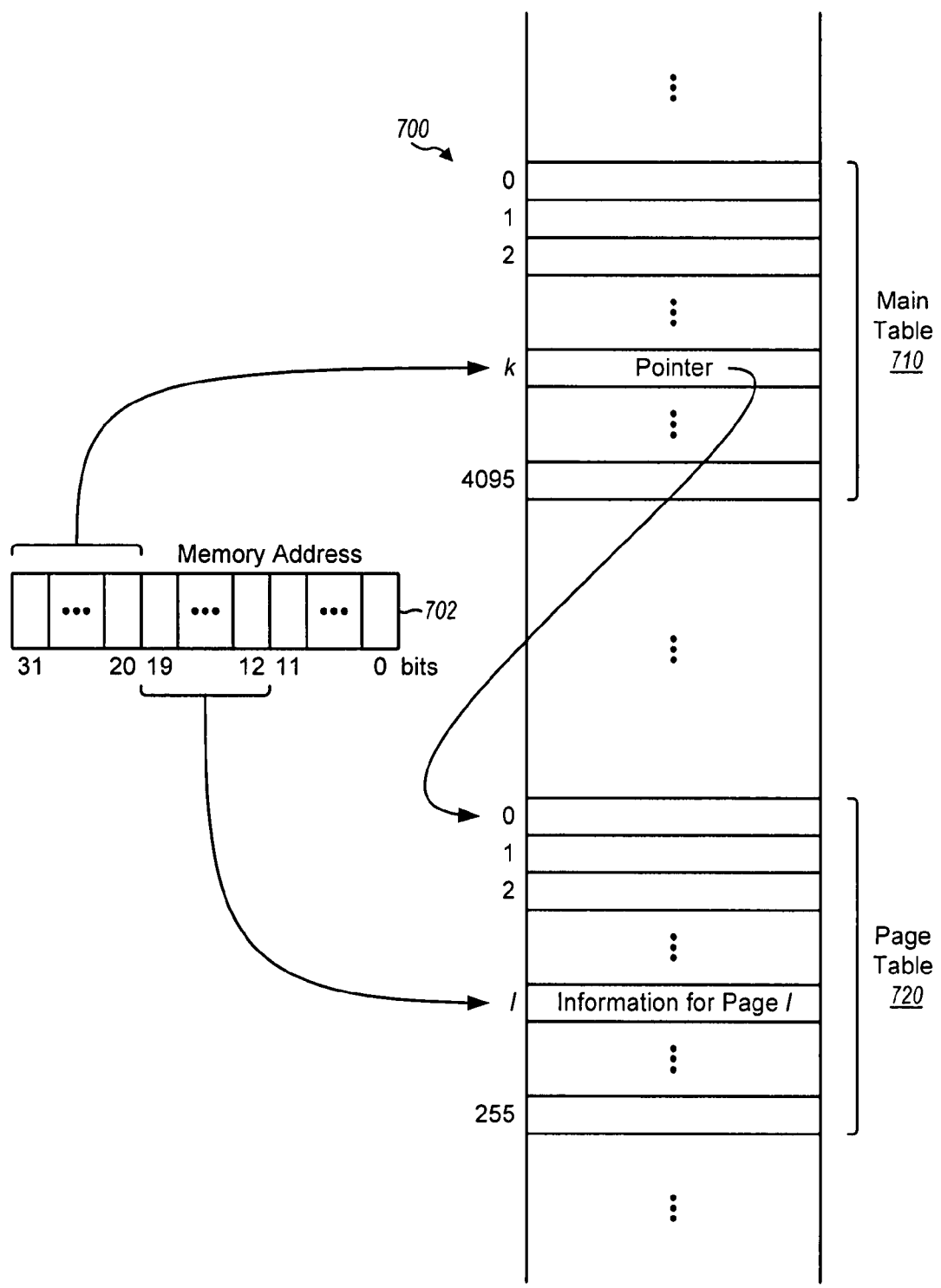
FIG. 7 shows a 2-level structure used to keep track of load status of pages of the second code image.

FIG. 7 shows a design of a 2-level structure 700 that may be used to determine whether a given page of second code image 222 is stored in SDRAM 152. In this design, a 32-bit memory address 702 may include bits 0 through 31 and may have an address range of 0 to 4 gigabytes (GB). The address range may be partitioned into 4096 sections, with each address section covering one megabyte (MB). Each address section may cover 256 pages, and each page may be 4 KB.

Structure 700 may include one main table 710 with 4096 entries for 4096 address sections, one entry for each address section. Structure 700 may further include one page table 720 for each address section. Each page table may include 256 entries for 256 pages, one entry for each page.

In one design, the main table and the page tables for the entire second code image 222 may be created and initialized prior to loading any page of second code image 222. For example, one main table and 64 page tables may be created within SDRAM 152 to support 64 MB of virtual memory for paging. Each entry in the main table may include a pointer to the start of the page table corresponding to that main table entry. The 256 entries of each page table may be initialized to a predetermined value to indicate that the 256 pages covered by these entries have not been loaded into SDRAM 152 (or no access permission for these 256 pages). When a page is loaded from NAND Flash 150 to SDRAM 152, the page table covering that page may be ascertained, and the entry for that page may be updated to indicate that the page has been loaded into SDRAM 152.

While second code image 222 is being loaded from NAND Flash 150, each memory access of SDRAM 152 may be checked to determine whether the requested page is stored in SDRAM 152. The 12 most significant bits (MSBs) of the memory address for a memory access may be used to access an entry in the main table. The pointer from this main table entry may be used to determine the start of the page table for the address section covering the memory address. The 8 next MSBs of the memory address may be used to determine a page table entry for the page being accessed. This page table entry may be checked to determine whether the page being accessed has been loaded into SDRAM 152. If the page has been loaded, then SDRAM 152 may be accessed to obtain the requested program code or data. If the page has not been loaded, then abort handler 520 may be notified, and the requested page may be loaded into SDRAM 152.

The main table and page tables may be used to determine whether individual pages of second code image 222 have been loaded into SDRAM 152. An indicator may be used to indicate whether all of the N pages of second code image 222 has been loaded into SDRAM 152. This indicator may be initialized to one value (e.g., 0) and may be set to another value (e.g., 1) once all of the pages of second code image 222 has been loaded into SDRAM 152. The main table and page tables may be deleted after the entire second code image 222 has been loaded.

FIG. 7 shows one design of structure 700 to determine whether pages of second code image 222 have been loaded into SDRAM 152. Structure 700 may be similar to a structure used for memory protection to keep track of which pages are accessible. Structure 700 may thus be implemented and updated in similar manner as the structure used for memory protection.

Various other structures may also be used to keep track of which pages of second code image 222 have been loaded into SDRAM 152. For example, a bit map containing one bit for each page may be used. The bit for each page may be set to one value (e.g., 0) if the page has not been loaded into SDRAM 152 or to another value (e.g., 1) if the page has been loaded.

Figure 8:
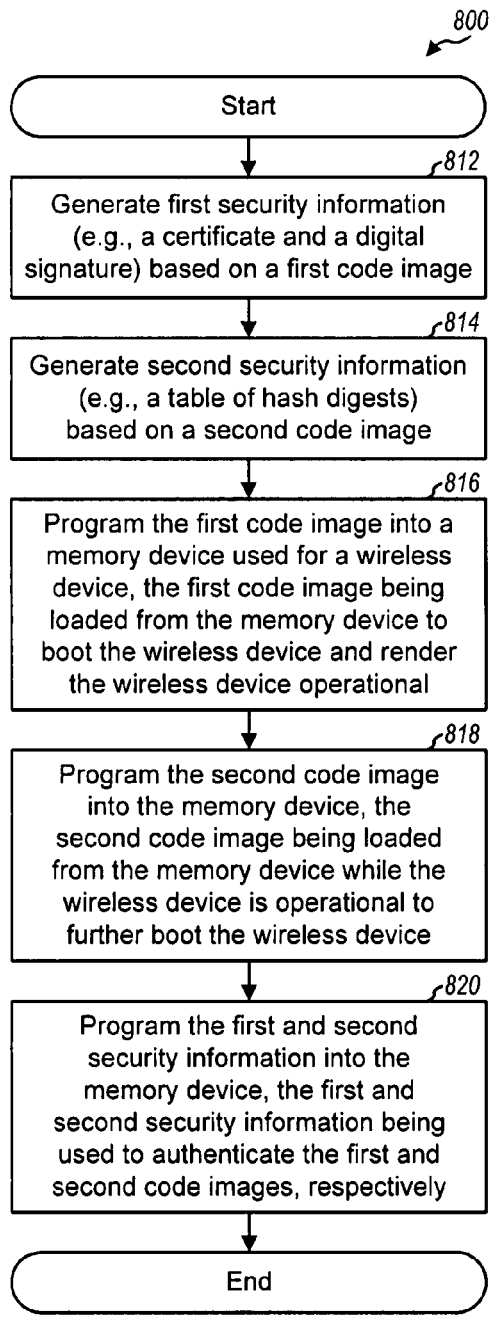
FIG. 8 shows a process for programming a memory device.

FIG. 8 shows a design of a process 800 for programming a memory device, e.g., during manufacturing or provisioning phase, in accordance with an aspect of the invention. First security information may be generated based on a first code image and possibly other information (block 812). Second security information may be generated based on a second code image (block 814). The first code image may be programmed into a memory device used for a wireless device (block 816). The first code image may be loaded from the memory device to boot the wireless device and render the wireless device operational. The second code image may be programmed into the memory device (block 818). The second code image may be loaded from the memory device while the wireless device is operational to further or fully boot the wireless device. The first and second security information may be programmed into the memory device and may be used to authenticate the first and second code images, respectively (block 820).

For block 814, the second code image may be partitioned into a plurality of pages, and each page may be hashed with a secure hash algorithm to obtain a hash digest for that page. A table of hash digests for the plurality of pages may be generated and programmed into the memory device in block 820. For block 812, a digital signature may be generated based on the first code image, a private key, and the table of hash digests for the second code image. A certificate containing a public key corresponding to the private key may be generated. The certificate and the digital signature may be programmed into the memory device in block 820.

Figure 9:
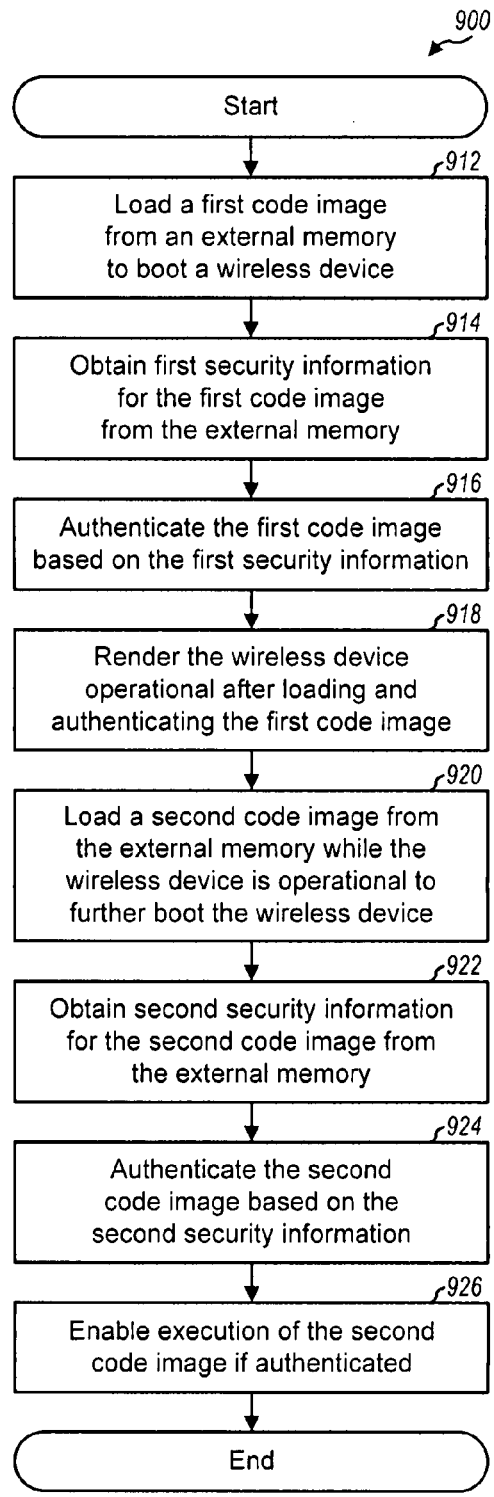
FIG. 9 shows a process for progressively booting the wireless device at power up.

FIG. 9 shows a design of a process 900 for performing progressive boot of a wireless device at power up, in accordance with an aspect of the invention. A first code image may be loaded from an external memory to boot the wireless device, e.g., loaded from a NAND Flash to an SDRAM (block 912). First security information for the first code image may be obtained from the external memory (block 914). The first code image may be authenticated based on the first security information (block 916). The wireless device may be rendered operational after loading and authenticating the first code image (block 918). While operational, the wireless device may be capable of processing keypad inputs, establishing calls with a wireless system, etc.

A second code image may be loaded from the external memory while the wireless device is operational to further boot the wireless device (block 920). Second security information for the second code image may be obtained from the external memory (block 922). The second code image may be authenticated based on the second security information (block 924). Execution of the second code image may be enabled if authenticated (block 926).

For block 920, the second code image may be loaded as background task and/or on-demand while the wireless device is operational. For on-demand loading, a memory access for a page of the second code image may be received. A predetermined number of pages of the second code image, including the page being accessed, may be loaded from the external memory in response to the memory access.

The second code image may comprise a plurality of pages, which may be loaded one page at a time from the external memory. At least one table may be maintained to keep track of pages of the second code image that have been loaded and pages of the second code image that have not been loaded. For example, a main table with multiple entries for multiple address ranges may be maintained. Multiple page tables for the multiple address ranges may also be maintained, one page table for each address range, with each page table including multiple entries for multiple pages within the address range for that page table. Each entry of the main table may include a pointer to a corresponding page table. Each entry of the corresponding page table may indicate whether an associated page is loaded and accessible. The table(s) may be created prior to loading the second code image and may be deleted after loading the second code image.

For block 916, the first security information may comprise a certificate and a digital signature. The certificate may be authenticated based on a root public key, which may be securely stored at the wireless device. The first code image may be authenticated based on the digital signature and a public key from the certificate. For block 924, the second security information may comprise at least one hash digest, which may be authenticated based on the first security information. The second code image may then be authenticated based on the at least one hash digest.

Figure 10:
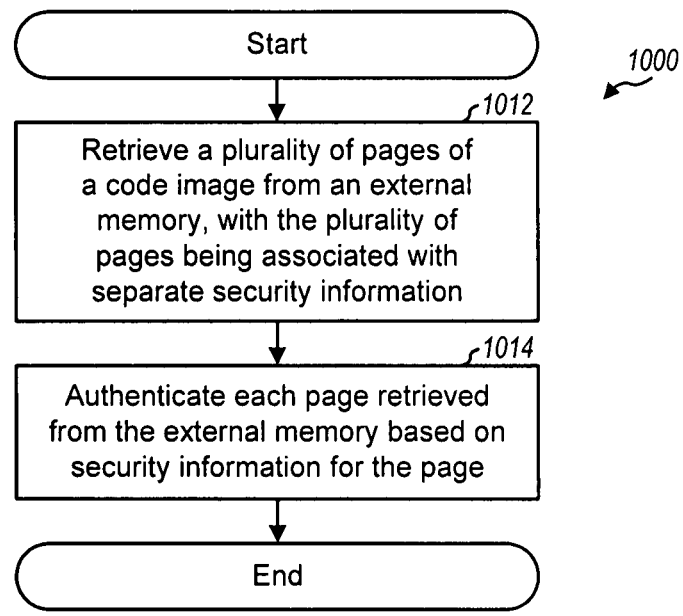
FIG. 10 shows a process for authenticating the second code image.

FIG. 10 shows a design of a process 1000 for authenticating a code image, in accordance with an aspect of the invention. Process 1000 may be used for blocks 920 to 924 in FIG. 9. A plurality of pages of a code image may be retrieved from an external memory, with the plurality of pages being associated with separate security information (block 1012). The plurality of pages may be retrieved one page at a time and either in a predetermined order (e.g., for background loading) or in a random order determined based on memory accesses for pages of the code image (e.g., for on-demand loading). Each page retrieved from the external memory may be authenticated based on security information for that page (block 1014). In one design, a table of hash digests for the plurality of pages may be retrieved from the external memory and authenticated. Each retrieved page may be hashed based on a secure hash algorithm to obtain a generated hash digest for that page. The retrieved page may be declared as authenticated if the generated hash digest matches an authenticated hash digest for the page, which may be from the table of hash digests.

Figure 11:
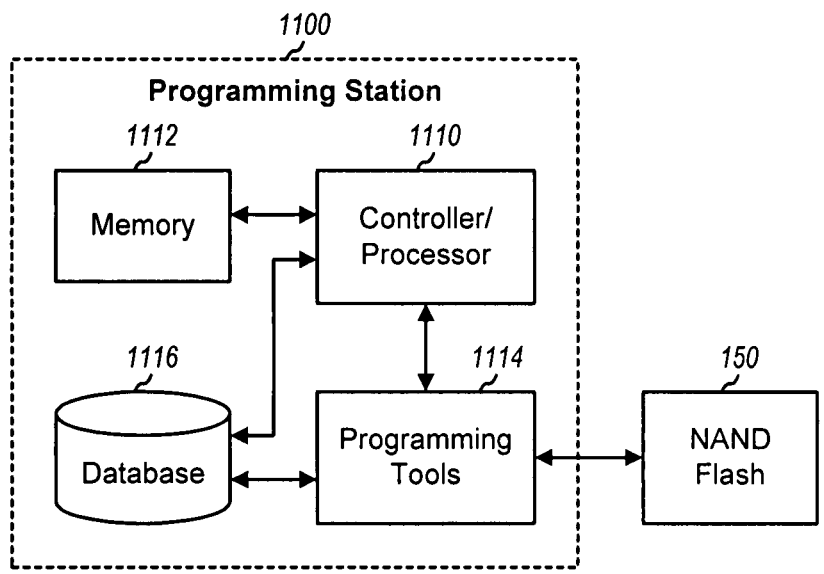
FIG. 11 shows a programming station.

FIG. 11 shows a block diagram of a design of programming station 1100 for NAND Flash 150, in accordance with an aspect of the invention. Programming station 1100 includes a controller/processor 1110, a memory 1112, programming tools 1114, and a database 1116. Controller/processor 1110 may perform the secure processing shown in FIG. 2 and may further direct the operation of programming station 1100. Memory 1112 may store data and codes used by controller/processor 1110. Programming tools 1114 may program NAND Flash 150, e.g., as shown in FIG. 2. Database 1116 may store the code images to be programmed into NAND Flash 150, cryptographic keys, etc. Programming station 1100 may perform process 800 in FIG. 8 and/or other processes to program memories.

For clarity, the boot techniques have been described for a memory configuration with a NAND Flash and an SDRAM. The boot techniques may also be used for other memory configurations and other types of memories. The boot techniques may further be used for any number of non-paged and paged code images, any number of non-paged and paged segments, any page size, etc.

The boot techniques described herein may provide certain advantages. A shorter perceived boot time may be achieved for memory load at power up. This may result in shorter factory test time since factory test codes may be stored in a non-paged segment and loaded first. The factory test codes may rely on the early loading of these codes and may have test equipment talk to a wireless device sooner after power up, even if the wireless device has not finished the loading process. The shorter perceived boot time may reduce the amount of time a user waits after power up and may thus improve user experience.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

The invention claimed is:

1. An apparatus comprising:
a processor configured to:
program first and second code images into a memory device used for a wireless device, the first code image being loaded from a non-paged segment of the memory device to boot the wireless device and render the wireless device operational, the second code image being loaded as separate pages of a plurality of pages from a paged segment of the memory device while the wireless device is operational to further boot the wireless device;
program a hash digest table into the non-paged segment of the memory device, the hash digest table including a plurality of hash digests each associated with a different page of the plurality of pages of the second code image, wherein each page of the plurality of pages is authenticatable by
generating a hash digest for each page of the plurality of pages loaded, and
comparing the hash digest generated to the associated hash digest included in the hash digest table, wherein authentication of each page of the plurality of pages is performed independent to other pages of the second code image; and
program a digital signature into the memory device, the digital signature being based on the first code image, a private key, and the hash digest table associated with the second code image, wherein the first code image is authenticatable by verifying the digital signature.

2. The apparatus of claim 1, wherein the processor is configured to:
generate a certificate containing a public key corresponding to the private key; and
program the certificate into the memory device.

3. The apparatus of claim 2, wherein the processor is configured to:
partition the second code image into the plurality of pages; and
hash each of the plurality of pages to generate the hash digest table.

4. The apparatus of claim 1, wherein the processor is configured to generate the digital signature.

5. A method comprising:
programming a first code image into a memory device used for a wireless device, the first code image being loaded from a non-paged segment of the memory device to boot the wireless device and render the wireless device operational;
programming a second code image into the memory device, the second code image being loaded as separate pages of a plurality of pages from a paged segment of the memory device while the wireless device is operational to further boot the wireless device;
programming a hash digest table into the non-paged segment of the memory device, the hash digest table including a plurality of hash digests each associated with a different page of the plurality of pages of the second code image, wherein each page of the plurality of pages is authenticatable by
generating a hash digest for each page of the plurality of pages loaded, and
comparing the hash digest generated to the associated hash digest included in the hash digest table, wherein authentication of each page of the plurality of pages is performed independent to other pages of the second code image; and
programming a digital signature into the memory device, the digital signature being based on the first code image, a private key, and the hash digest table associated with the second code image, wherein the first code image is authenticatable by verifying the digital signature.

6. The method of claim 5, further comprising:
generating a certificate containing a public key corresponding to the private key; and
programming the certificate into the memory device.

7. The method of claim 6, wherein the generating the second security information comprises partitioning the second code image into the plurality of pages, and separately hashing each of the plurality of pages to generate the hash digest table.

8. An apparatus comprising:
means for programming a first code image into a memory device used for a wireless device, the first code image being loaded from a non-paged segment of the memory device to boot the wireless device and render the wireless device operational;
means for programming a second code image into the memory device, the second code image being loaded as separate pages of a plurality of pages from a paged segment of the memory device while the wireless device is operational to further boot the wireless device;

means for programming a hash digest table into the non-paged segment of the memory device, the hash digest table including a plurality of hash digests each associated with a different page of the plurality of pages of the second code image, wherein each page of the plurality of pages is authenticatable by
  generating a hash digest for each page of the plurality of pages loaded, and
  comparing the hash digest generated to the associated hash digest included in the hash digest table, wherein authentication of each page of the plurality of pages is performed independent to other pages of the second code image; and
means for programming a digital signature into the memory device, the digital signature being based on the first code image, a private key, and the hash digest table associated with the second code image, wherein the first code image and the hash digest table are authenticatable by verifying the digital signature.

9. The apparatus of claim 8, further comprising:
means for generating a certificate containing a public key corresponding to the private key; and
means for programming the certificate into the memory device.

10. The apparatus of claim 9, wherein the means for generating the second security information comprises means for partitioning the second code image into the plurality of pages, and means for hashing each of the plurality of pages to generate the hash digest table.

11. An apparatus comprising:
a memory controller configured to load a first code image and a hash digest table from a non-paged segment of an external memory to boot a wireless device,
  load a digital signature from the external memory, wherein the digital signature is based on the first code image, a private key, and the hash digest table, and
  load a plurality of pages of a second code image from a paged segment of the external memory while the wireless device is operational to further boot the wireless device; and
a main controller configured to
  render the wireless device operational after the first code image is loaded,
  authenticate the first code image by verifying the digital signature, and
  authenticate each page of the second code image loaded by generating a hash digest for each page of the second code image, and comparing the hash digest generated to a hash digest stored in the hash digest table associated with the page of the second code image being authenticated, wherein authentication of each page of the second code image is performed independent to other pages of the second code image.

12. The apparatus of claim 11, wherein the memory controller is configured to load the second code image as background task while the wireless device is operational.

13. The apparatus of claim 11, wherein the memory controller is configured to receive a memory access for a page of the second code image, and to load a predetermined number of pages of the second code image, including the page being accessed, from the external memory in response to the memory access.

14. The apparatus of claim 11, wherein the main controller is configured to render the wireless device operational if the first code image is authenticated.

15. The apparatus of claim 11, wherein the memory controller is configured to authenticate a certificate based on a root public key and to authenticate the first code image based on the digital signature and a public key from the certificate.

16. The apparatus of claim 11, wherein the memory controller is configured to obtain second security information for the second code image from the external memory, to authenticate the second code image based on the second security information, and to enable execution of the second code image if authenticated.

17. The apparatus of claim 16, wherein the second security information comprises the hash digests generated for each page of the second code image, and wherein the memory controller is configured to authenticate the second code image on a page-by-page basis based on the hash digests generated.

18. The apparatus of claim 11, wherein the memory controller is configured to load the plurality of pages of the second code image, one page at a time, from the external memory.

19. The apparatus of claim 18, wherein the memory controller is configured to maintain at least one table indicative of pages of the second code image that have been loaded from the external memory and pages of the second code image that have not been loaded.

20. The apparatus of claim 19, wherein the memory controller is configured to create the at least one table prior to loading the second code image, and to delete the at least one table after loading the second code image.

21. The apparatus of claim 18, wherein the hash digest table includes multiple entries for multiple address ranges, and multiple page tables for the multiple address ranges, one page table for each address range, and each page table includes multiple entries for multiple pages within the address range for the page table.

22. The apparatus of claim 21, wherein each entry of the hash digest table includes a pointer to a corresponding page table, and wherein each entry of the corresponding page table indicates whether an associated page is accessible.

23. The apparatus of claim 11, wherein the external memory is a NAND Flash memory, and wherein the memory controller is configured to load the first and second code images from the NAND Flash to a synchronous dynamic random access memory (SDRAM).

24. The apparatus of claim 11, wherein while operational the wireless device is capable of at least one of processing keypad inputs and establishing calls with a wireless communication system.

25. A method comprising:
loading a first code image and a hash digest table from a non-paged segment of an external memory to boot a wireless device;
loading a digital signature from the external memory, wherein the digital signature is based on the first code image, a private key, and the hash digest table;
authenticating the first code image by verifying the digital signature;
rendering the wireless device operational after loading the first code image;
loading a plurality of pages of a second code image from a paged segment of the external memory while the wireless device is operational to further boot the wireless device;
authenticating each page of the second code image loaded by generating a hash digest for each page of the second code image; and
comparing the hash digest generated to a hash digest stored in the hash digest table associated with the page of the second code image being authenticated, wherein authentication of each page of the second code image is performed independent to other pages of the second code image.

26. The method of claim 25, wherein the loading the second code image comprises loading the second code image as background task while the wireless device is operational.

27. The method of claim 25, wherein the loading the second code image comprises
receiving a memory access for a page of the second code image, and
loading a predetermined number of pages of the second code image, including the page being accessed, from the external memory in response to the memory access.

28. The method of claim 25, further comprising:
obtaining a certificate from the external memory; and
authenticating the certificate based on a root public key.

29. The method of claim 28, further comprising:
authenticating the hash digests generated by verifying the digital signature.

30. An apparatus comprising:
means for loading a first code image and a hash digest table from a non-paged segment of an external memory to boot a wireless device;
means for loading a digital signature from the external memory, wherein the digital signature is based on the first code image, a private key, and the hash digest table;
means for authenticating the first code image by verifying the digital signature;
means for rendering the wireless device operational after loading the first code image;
means for loading a plurality of pages of a second code image from a paged segment of the external memory while the wireless device is operational to further boot the wireless device; and
means for authenticating each page of the second code image loaded by generating a hash digest for each page of the second code image, and comparing the hash digest generated to a hash digest stored in the hash digest table associated with the page of the second code image being authenticated, wherein authentication of each page of the second code image is performed independent to other pages of the second code image.

31. The apparatus of claim 30, further comprising:
means for obtaining a certificate from the external memory; and
means for authenticating the certificate based on a root public key.

32. The apparatus of claim 30, further comprising:
means for obtaining second security information for the second code image from the external memory;
means for authenticating the second code image based on the second security information; and
means for enabling execution of the second code image if authenticated.

33. The apparatus of claim 32, wherein the second security information comprises the hash digests generated for each page of the second code image, and wherein the means for authenticating the second code image comprises means for authenticating the hash digests generated based on the first security information.

34. A non-transitory computer-readable medium comprising:
code for causing one or more processors to load a first code image and a hash digest table from a non-paged segment of an external memory to boot a wireless device;
code for causing the one or more processors to load a digital signature from the external memory, wherein the digital signature is based on the first code image, a private key, and the hash digest table;
code for causing the one or more processors to authenticate the first code image by verifying the digital signature;
code for causing the one or more processors to render the wireless device operational after loading the first code image;
code for causing the one or more processors to load a plurality of pages of a second code image from a paged segment of the external memory while the wireless device is operational to further boot the wireless device; and
code for causing the one or more processors to authenticate each page of the second code image loaded by generating a hash digest for each page of the second code image, and comparing the hash digest generated to a hash digest stored in the hash digest table associated with the page of the second code image being authenticated, wherein authentication of each page of the second code image is performed independent to other pages of the second code image.

35. The non-transitory computer-readable medium of claim 34, the computer-readable medium further comprising:
code for causing the one or more processors to obtain first security information for the first code image from the external memory;
code for causing the one or more processors to authenticate the first code image based on the first security information; and
code for causing the one or more processors to render the wireless device operational if the first code image is authenticated.

36. The non-transitory computer-readable medium of claim 35, the computer-readable medium further comprising:
code for causing the one or more processors to obtain second security information for the second code image from the external memory;
code for causing the one or more processors to authenticate the second code image based on the second security information; and
code for causing the one or more processors to enable execution of the second code image if authenticated.

37. A non-transitory computer-readable medium comprising:
code for causing one or more processors to program a first code image into a memory device used for a wireless device, the first code image being loaded from a non-paged segment of the memory device to boot the wireless device and render the wireless device operational;
code for causing the one or more processors to program a second code image into the memory device, the second code image being loaded as separate pages of a plurality of pages from a paged segment of the memory device while the wireless device is operational to further boot the wireless device;
code for causing the one or more processors to program a hash digest table into the nonpaged segment of the memory device, the hash digest table including a plurality of hash digests each associated with a different page of the plurality of pages of the second code image, wherein each page of the plurality of pages is authenticatable by
generating a hash digest for each page of the plurality of pages loaded, and
comparing the hash digest generated to the associated hash digest included in the hash digest table, wherein authentication of each page of the plurality of pages is performed independent to other pages of the second code image; and code for causing the one or more processors to program a digital signature into the memory device, the digital signature being based on the first code image, a private key, and the hash digest table associated with the second code image, wherein the first code image is authenticatable by verifying the digital signature.

38. The apparatus of claim 1, wherein at least a portion of the first code image and the hash digest table are authenticatable through a cryptographic signature.

* * * * *